US009152950B2

(12) United States Patent
Weir et al.

(10) Patent No.: US 9,152,950 B2
(45) Date of Patent: Oct. 6, 2015

(54) SYSTEM AND METHOD FOR COLLABORATION

(75) Inventors: Robert Cameron Weir, Westford, MA (US); Barry E. Willner, Briarcliff Manor, NY (US); Patrick Joseph O'Sullivan, Ballsbridge (IE); Edith Helen Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1751 days.

(21) Appl. No.: 11/834,292

(22) Filed: Aug. 6, 2007

(65) Prior Publication Data

US 2009/0043851 A1    Feb. 12, 2009

(51) Int. Cl.
*G06F 15/16*    (2006.01)
*G06Q 10/10*    (2012.01)

(52) U.S. Cl.
CPC .................................. *G06Q 10/107* (2013.01)

(58) Field of Classification Search
CPC .................................................. G06Q 10/107
USPC .......................... 709/206; 379/265; 705/36 R
See application file for complete search history.

(56) References Cited

U.S. PATENT DOCUMENTS

| | | | |
|---|---|---|---|
| 6,662,212 B1 * | 12/2003 | Chandhok et al. ............ 709/206 |
| 6,865,599 B2 | 3/2005 | Zhang |
| 7,016,877 B1 | 3/2006 | Steele et al. |
| 7,305,381 B1 * | 12/2007 | Poppink et al. ........................ 1/1 |
| 7,707,249 B2 * | 4/2010 | Spataro et al. ................ 709/205 |
| 8,126,975 B2 * | 2/2012 | Hoyne et al. .................. 709/206 |
| 8,140,975 B2 * | 3/2012 | Lemay et al. .................. 715/730 |
| 8,161,120 B2 * | 4/2012 | Tan ................................. 709/206 |
| 8,468,244 B2 * | 6/2013 | Redlich et al. ................ 709/225 |
| 8,589,502 B2 * | 11/2013 | O'Sullivan et al. ........... 709/207 |
| 2002/0107931 A1 | 8/2002 | Singh et al. |
| 2003/0200137 A1 * | 10/2003 | Drummond ..................... 705/12 |
| 2004/0230989 A1 * | 11/2004 | Macey et al. ..................... 725/24 |
| 2005/0197871 A1 * | 9/2005 | Mendonca et al. ............... 705/7 |
| 2006/0240851 A1 * | 10/2006 | Washburn ..................... 455/466 |
| 2007/0016647 A1 * | 1/2007 | Gupta et al. .................. 709/206 |
| 2007/0233777 A1 * | 10/2007 | Bates et al. ................... 709/202 |
| 2008/0208988 A1 | 8/2008 | Khouri et al. |
| 2008/0259824 A1 * | 10/2008 | Frankel ......................... 370/260 |
| 2009/0013043 A1 * | 1/2009 | Tan ................................ 709/205 |

OTHER PUBLICATIONS

Gburzynski, et al., "Fight the Spam Wars: A Remailer Approach with Restrictive Aliasing", ACM Transactions on Internet Technology, vol. 4, No. 1, Feb. 2004, pp. 1-30.

Hess, et al., "An Access Control Model for Dynamic Client-Side Content", ACM Transactions on Computer Systems, vol. 18, No. 3, Aug. 2000, pp. 207-332.

Hess, et al., "Content-Triggered Trust Negotiation", ACM Transactions on Information and System Security, vol. 7, No. 3, Aug. 2004, pp. 428-456.

* cited by examiner

*Primary Examiner* — Asad Nawaz
*Assistant Examiner* — Syed S Ali
(74) *Attorney, Agent, or Firm* — Holland & Knight LLP; Brian J. Colandreo, Esq.; Jeffrey T. Placker, Esq.

(57) ABSTRACT

A method and computer program product for receiving notification of a first user response message concerning an email message received from a sender; receiving notification of a second user response message concerning the email message received from the sender; and providing the first and second users with one or more statistics concerning the email message.

14 Claims, 6 Drawing Sheets

SYSTEM AND METHOD FOR COLLABORATION

TECHNICAL FIELD

This disclosure relates to collaboration and, more particularly, to automatic online collaboration in response to an initiating email message.

BACKGROUND

Email systems, as currently implemented, offer insufficient coordination and collaboration. Specifically, a one-to-many email may provide the required information to a large number of people, but the current systems do not easily handle the subsequent responses, both back to the original sender as well as amongst various recipients. For example, if twenty people are sent an email and they all respond and copy each other, an email storm of over four-hundred messages is the result.

Conventional approaches to solving this problem have included the use of threaded email views, which allow the email user to organize the larger volume of information in a topical manner. However, this does not radically reduce the amount of time needed to read, correlate and summarize the email responses.

SUMMARY OF DISCLOSURE

In a first implementation, a method includes receiving notification of a first user response message concerning an email message received from a sender; receiving notification of a second user response message concerning the email message received from the sender; and providing the first and second users with one or more statistics concerning the email message.

One or more of the following features may be included. The first user response message may include at least one predefined comment chosen from a plurality of predefined comments. The second user response message may include at least one predefined comment chosen from the plurality of predefined comments. Providing the first and second users with one or more statistics concerning the email message may include providing the first and second users with one or more statistics concerning the at least one predefined comment chosen by the first user and the at least one predefined comment chosen by the second user.

At least a portion of the email message may be posted to an online collaborative workspace. At least a portion of the one or more statistics may be posted to an online collaborative workspace. The online collaborative workspace may be chosen from the group consisting of: a webpage; a wiki; a blog; a teamspace; a discussion group; and an activity group.

The email message may be addressed to one or more recipients. Rights concerning the online collaborative workspace may be assigned to at least a portion of the one or more recipients. The one or more recipients may be chosen from the group consisting of one or more "TO" recipients, one or more "CC" recipients, and one or more "BCC" recipients. Assigning rights concerning the online collaborative workspace may include: granting editorial rights for the online collaborative workspace to the "TO" recipients; granting read-only rights for the online collaborative workspace to the "CC" recipients; and granting read-only rights for the online collaborative workspace to the "BCC" recipients.

The plurality of predefined comments may include: "I Agree"; "I Disagree"; "I Choose Not to Express an Opinion"; "I Agree and Will Send a Response Message"; "I Disagree and Will Send a Response Message"; "I Choose Not to Express an Opinion and Will Send a Response Message"; and "Do Not Copy Further on this E-mail".

Providing the first and second users with one or more statistics concerning the email message may include providing the first and second users with a numeric count statistic concerning at least one of the plurality of predefined comments. Providing the first and second users with one or more statistics concerning the email message may include providing the first and second users with a percentage statistic concerning at least one of the plurality of predefined comments.

In another implementation, a computer program product resides on a computer readable medium that has a plurality of instructions stored on it. When executed by a processor, the instructions cause the processor to perform operations including receiving notification of a first user response message concerning an email message received from a sender; receiving notification of a second user response message concerning the email message received from the sender; and providing the first and second users with one or more statistics concerning the email message.

One or more of the following features may be included. The first user response message may include at least one predefined comment chosen from a plurality of predefined comments. The second user response message may include at least one predefined comment chosen from the plurality of predefined comments. Providing the first and second users with one or more statistics concerning the email message may include providing the first and second users with one or more statistics concerning the at least one predefined comment chosen by the first user and the at least one predefined comment chosen by the second user.

At least a portion of the email message may be posted to an online collaborative workspace. At least a portion of the one or more statistics may be posted to an online collaborative workspace. The online collaborative workspace may be chosen from the group consisting of: a webpage; a wiki; a blog; a teamspace; a discussion group; and an activity group.

The email message may be addressed to one or more recipients. Rights concerning the online collaborative workspace may be assigned to at least a portion of the one or more recipients. The one or more recipients may be chosen from the group consisting of one or more "TO" recipients, one or more "CC" recipients, and one or more "BCC" recipients. Assigning rights concerning the online collaborative workspace may include: granting editorial rights for the online collaborative workspace to the "TO" recipients; granting read-only rights for the online collaborative workspace to the "CC" recipients; and granting read-only rights for the online collaborative workspace to the "BCC" recipients.

The plurality of predefined comments may include: "I Agree"; "I Disagree"; "I Choose Not to Express an Opinion"; "I Agree and Will Send a Response Message"; "I Disagree and Will Send a Response Message"; "I Choose Not to Express an Opinion and Will Send a Response Message"; and "Do Not Copy Further on this E-mail".

Providing the first and second users with one or more statistics concerning the email message may include providing the first and second users with a numeric count statistic concerning at least one of the plurality of predefined comments. Providing the first and second users with one or more statistics concerning the email message may include providing the first and second users with a percentage statistic concerning at least one of the plurality of predefined comments.

The details of one or more implementations are set forth in the accompanying drawings and the description below. Other

BRIEF DESCRIPTION OF THE DRAWINGS

Like reference symbols in the various drawings indicate like elements.

DETAILED DESCRIPTION OF THE PREFERRED EMBODIMENTS

Figure 1:
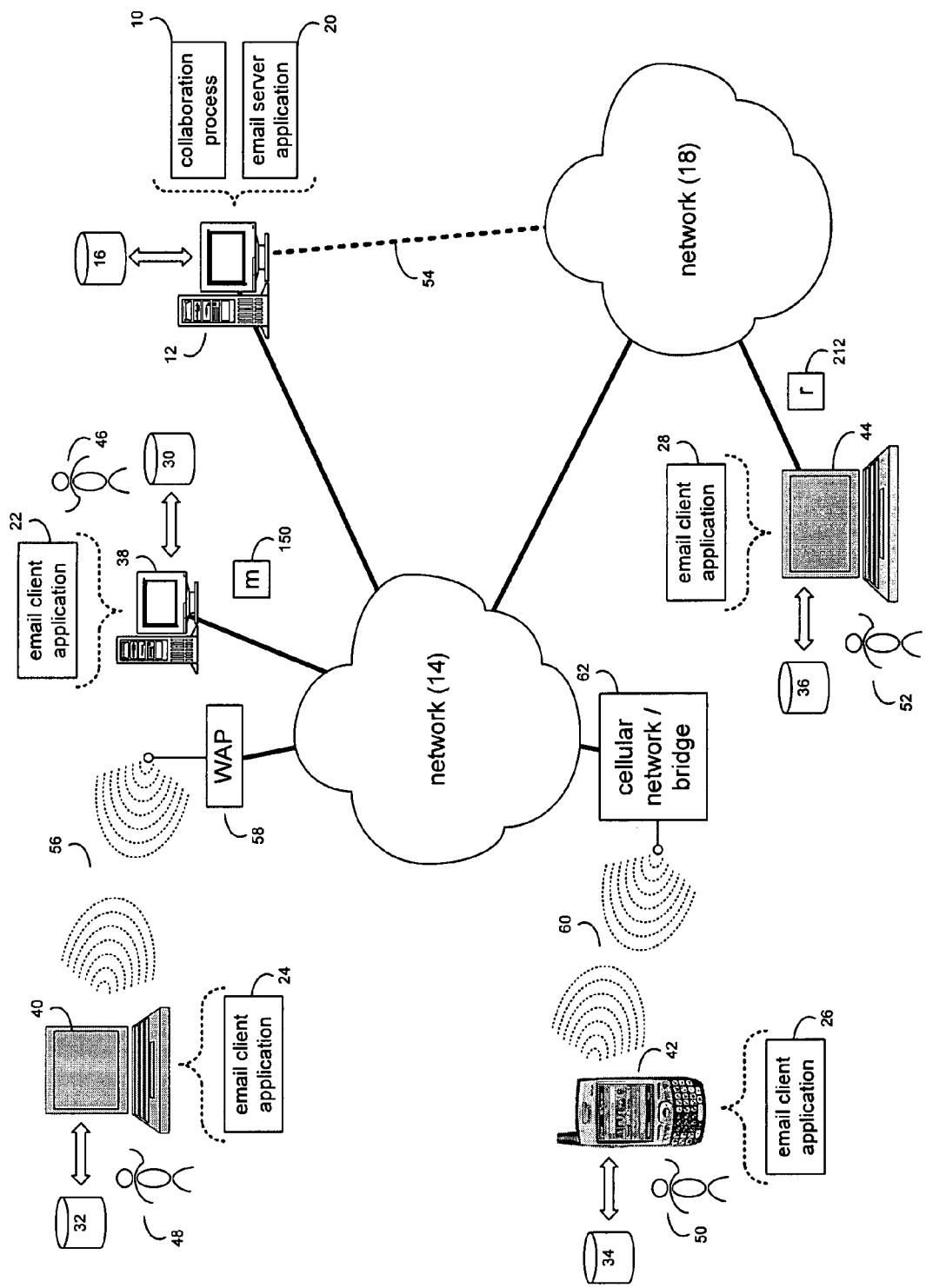
FIG. 1 is a diagrammatic view of a collaboration process and an email client application coupled to a distributed computing network.

System Overview:

Referring to FIG. 1, there is shown collaboration process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

As will be discussed below in greater detail, collaboration process 10 may receive notification of a first user response message concerning an email message received from a sender; receive notification of a second user response message concerning the email message received from the sender; and provide the first and second users with one or more statistics concerning the email message.

The instruction sets and subroutines of collaboration process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute email server application 20, examples of which may include but are not limited to Lotus Domino™ Server and Microsoft Exchange™ Server. Email server application 20 may be a mail transfer agent that may store and route email to one or more email client applications 22, 24, 26, 28, examples of which may include but are not limited to Lotus Notes™ and Microsoft Outlook™ Collaboration process 10 may be a stand alone application that interfaces with email server application 20 or an applet/application that is executed within email server application 20.

The instruction sets and subroutines of email server application 20, which may be stored on storage device 16 coupled to server computer 12 may be executed by one or more processors (not shown) and one or more memory architectures (not shown) incorporated into server computer 12.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may access email server application 20 and may retrieve and/or organize email messages.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Collaboration Process:

For the following discussion, email client application 22 is going to be described for illustrative purposes. However, this is not intended to be a limitation of this disclosure, as other email client applications (e.g., email client applications 24, 26, 28) may be equally utilized.

Figure 2:
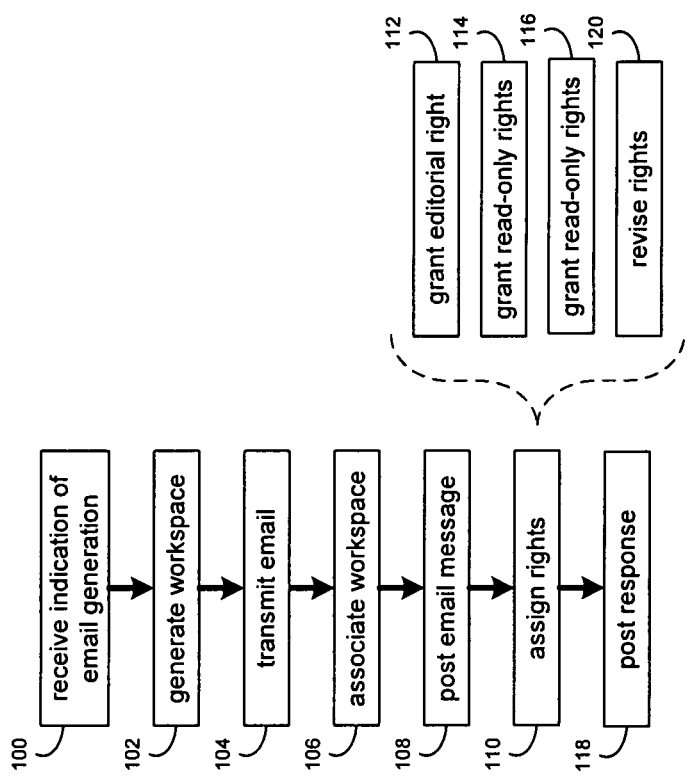
FIG. 2 is a flowchart of a process executed by the collaboration process of FIG. 1.
Figure 3:
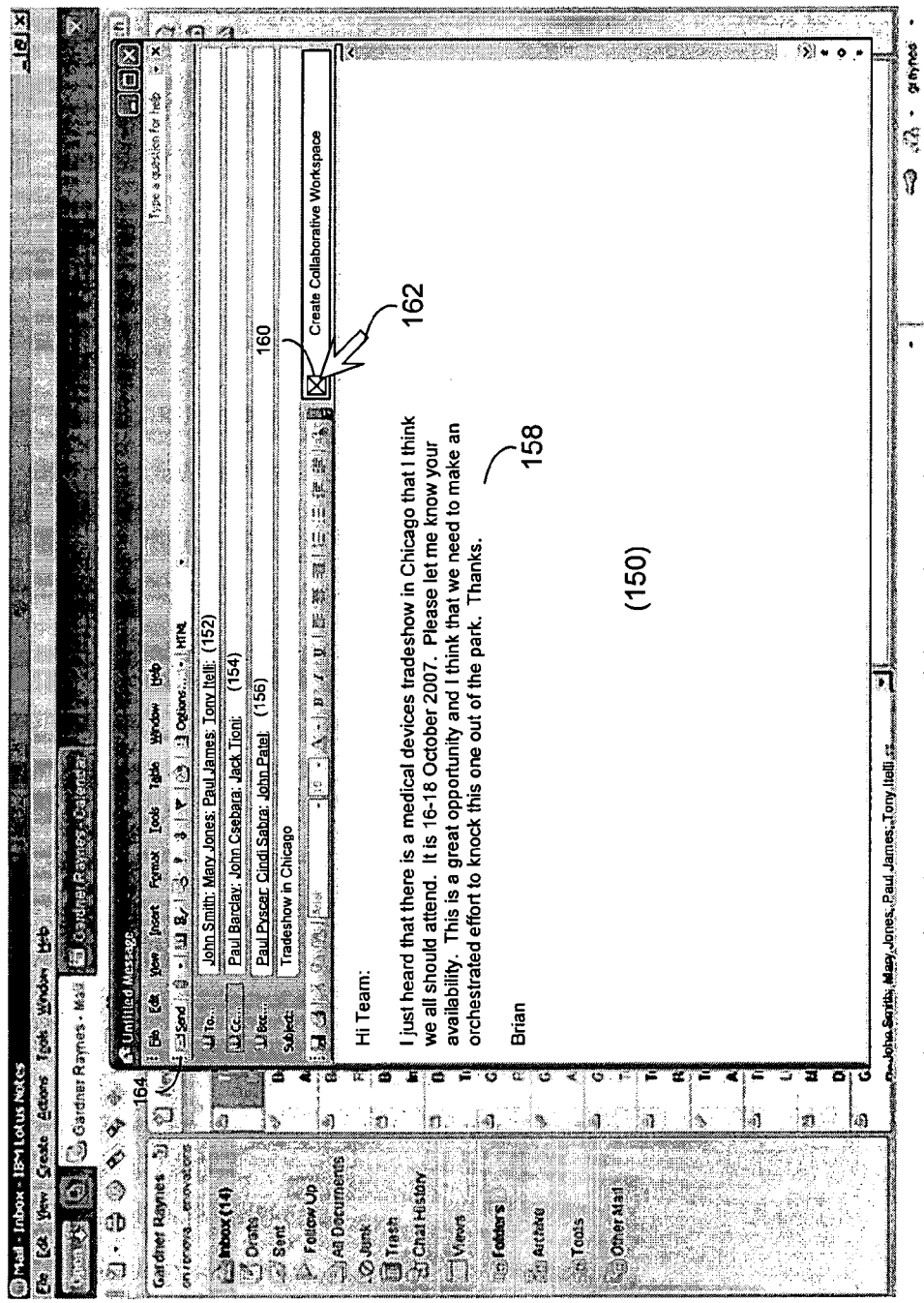
FIG. 3 is a diagrammatic view of a display screen rendered by the collaboration process and/or the email client application of FIG. 1.

Referring also to FIGS. 2 & 3, email client application 22 (alone or in combination with collaboration process 10 and/or email server application 20) may allow a user (e.g., user 46) to generate 100 email message 150 that is addressed to one or more recipients. As is known in the art, email message 150 may be addressed to "TO" recipients 152, "CC" (i.e., carbon copy) recipients 154, and "BCC" (blind carbon copy) recipients 156. Further and as is known in the art, email message 150 may include message content 158 (i.e., the body of the email message) that may solicit a response from the recipients of email message 150. For example, message content 158 included within email message 150 may include a request, such as:

I think that we should attend the Chicago tradeshow. I personally feel that our attendance would provide great exposure to our group. Please let me know what you think!

Accordingly, email message 150 is soliciting a response from the recipients of the email. When generating 100 email message 150, user 46 (i.e., the user of email client application 22) may choose to generate 102 an online collaborative workspace. Examples of online collaborative workspace may include but are not limited to: a webpage; a wiki; a blog; a teamspace; a discussion group; and an activity group.

A webpage is a resource of information that is suitable for use on the internet and may be accessed through a web browser. A webpage may be in HTML or XHTML format and may provide navigation to other webpages via hypertext links.

A wiki is a website that may allow visitors to add, remove, and edit content. A collaborative technology for organizing information on websites, wikis may allow for linking amongst any number of webpages. Wikis may be editable by the general public.

A blog is a website in which entries may be written in a chronological order and may be displayed in reverse chronological order. Blogs may provide commentary or news on a particular subject such as food, politics, or local news; or may function as a personal online diary.

A teamspace is a web-based collaborative workspace for managing shared work processes and maintaining shared artifacts in a project that may span months or years. A teamspace may cover both synchronous and asynchronous cross-company team activities and may provide a seamless transition between different work modes.

A discussion group is a web application for holding discussions and posting user-generated content. The term "group" may refer to the entire community or to a specific sub-forum dealing with a distinct topic. Messages within a sub-forum may be displayed either in chronological order or as threaded discussions.

An activity may be a collaborative event in which multiple users collaborate to achieve a common goal. For example, members of an activity may be allowed to contribute and share content amongst members to facilitate the completion of the goal.

An online collaborative workspace may allow users to collaborate, exchange content, establish timelines, allocate resources, and establish schedules/goals required to achieve a common goal. For example, a common goal may concern the attendance of Company X at the above-referenced Chicago tradeshow. Specifically, this common goal may include a plurality of discrete tasks, such as securing booth space at the tradeshow so that Company X may exhibit their goods/services. Additionally, Company X may need to make travel arrangements, arrange for the shipping of booth backdrops, platforms and tables. Further, Company X may need to have signage created and may need to obtain trinkets for giving to visitors of their booth. Accordingly, Company X attending a tradeshow may be a common goal that may include a plurality of discrete tasks.

As would be expected, each of these discrete tasks may be performed by different individuals (or different groups of individuals). In order to increase efficiency, it may be desirable for each individual (or group of individuals) to collaborate with each other.

As discussed above, when generating 100 email message 150, user 46 may choose to generate 102 an online collaborative workspace. Accordingly, user 46 may e.g., select "Create Workspace" checkbox 160 (using onscreen pointer 162 that is controllable by a pointing device, not shown). User 46 may then select "Send" button 164 using onscreen pointer 162, which may result in email message 150 being transmitted 104 to the one or more recipients.

Figure 4:
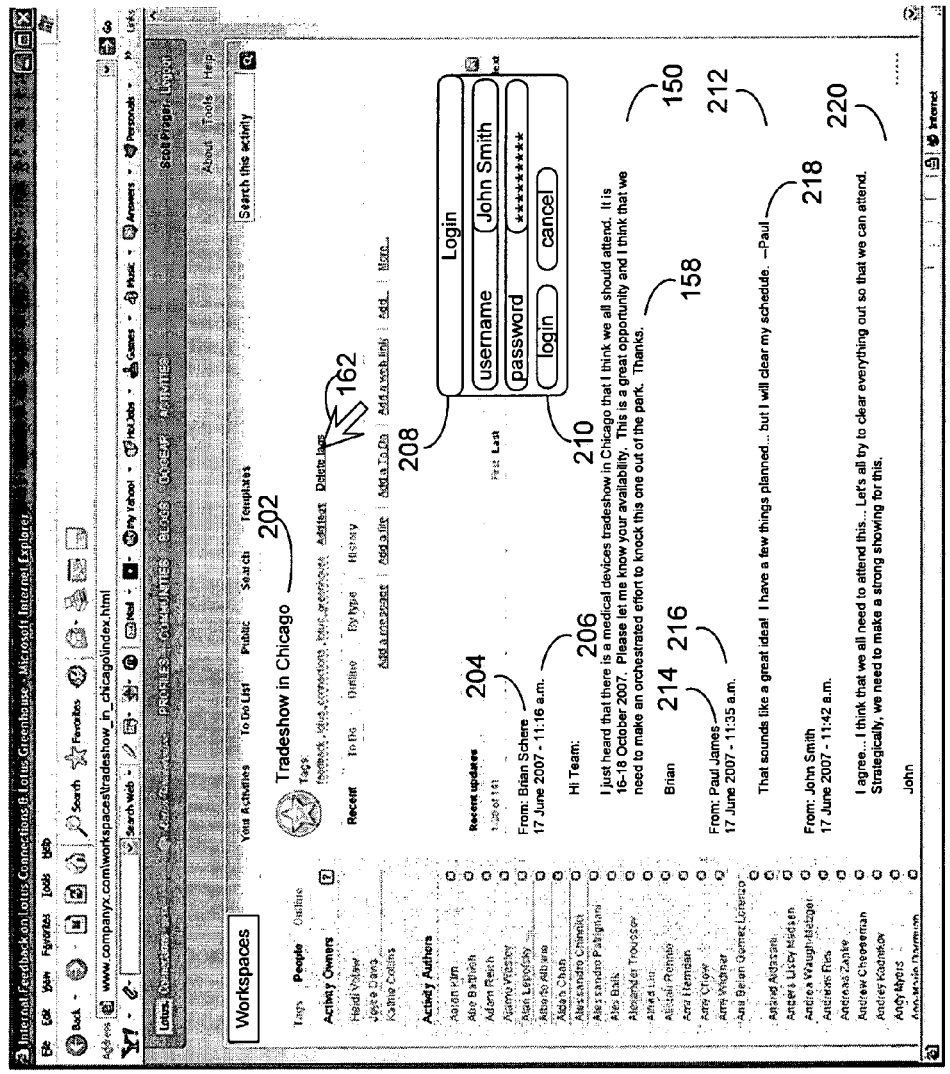
FIG. 4 is a diagrammatic view of a display screen rendered by the collaboration process and/or the email client application of FIG. 1.

Referring also to FIG. 4, collaboration process 10 may generate 102 online collaborative workspace 200 and may associate 106 online collaborative workspace 200 with email message 150. For example, collaboration process 10 may set the title 202 of online collaborative workplace 200 to be the same as the subject of email message 150. For illustrative purposes, the title 202 of online collaborative workspace 200 is set to "Tradeshow in Chicago". When generating 102 online collaborative workspace 200, collaboration process 10 may define one or more directories and may generate one or more webpages. For example, collaboration process 10 may define directory "tradeshow_in_chicago" as a subdirectory of directory "workspaces" in the domain "www.companyx.com".

When generating 102 online collaborative workspace 200, collaboration process 10 may post 108 at least a portion of email message 150 to online collaborative workspace 200. For example and for illustrative purposes, online collaborative workspace 200 is shown to include message content 158 from email message 150. Additionally, collaboration process 10 is shown to include (within online collaborative workspace 200) a poster identifier 204 for identifying the poster of the entry (i.e., email message 150) within online collaborative workspace 200. Additionally, collaboration process 10 may include time/date stamp 206 that defines the time that the entry was posted to online collaborative workspace 200. Time/date stamp 206 may be a time/date stamp extracted from email message 150.

As discussed above, email message 150 may be addressed to: "TO" recipients 152 (e.g., John Smith, Mary Jones, Paul James & Tony Itelli); "CC" recipients 154 (e.g., Paul Barclay, John Csebara & Jack Tioni); and "BCC" recipients 156 (e.g., Paul Pyscer, Cindi Sabra & John Patel).

Collaboration process 10 may allow user 46 to assign 110 rights, concerning online collaborative workspace 200, to at least a portion of the recipients of email message 150. For example, user 46 (via collaboration process 10) may grant 112 editorial rights, concerning online collaborative workspace 200, to "TO" recipients 152. Additionally, user 46 (via collaboration process 10) may grant 114 read-only rights, concerning online collaborative workspace 200, to "CC" recipients 154. Further, user 46 (via collaboration process 10) may grant 116 read-only rights, concerning online collaborative workspace 200, to "BCC" recipients 156. These examples are for illustrative purposes only and are not intended to be a limitation of this disclosure. Specifically, the types of rights and the manner in which the rights are distributed may vary depending upon e.g., design criteria and system requirements.

If "TO" recipients 152 (e.g., John Smith, Mary Jones, Paul James & Tony Itelli) are granted 112 editorial rights, "TO" recipients 152 may be allowed to review and edit content included within online collaboration process 200. For example, "John Smith" may be allowed to modify (e.g., edit/remove) message content 158 included within online collaborative workspace 200. Additionally, "John Smith" may be allowed to add/post content to online collaborative workspace 200.

If "CC" recipients 154 (e.g., Paul Barclay, John Csebara & Jack Tioni) are granted 114 read-only rights, "CC" recipients 154 may be allowed to review content included within online collaboration process 200. For example, "Paul Barclay" may be allowed to review message content 158 included within online collaborative workspace 200.

If "BCC" recipients 156 (e.g., Paul Pyscer, Cindi Sabra & John Patel) are granted 116 read-only rights, "BCC" recipients 156 may be allowed to review content included within online collaboration process 200. For example, "Paul Pyscer" may be allowed to review message content 158 included within online collaborative workspace 200.

As different users of online collaborative workspace 200 may be assigned different rights, when a user attempts to access online collaborative workspace 200, the user may be required to log into online collaborative workspace 200. For example, upon user 46 attempting to access:
www.companyx.com\workspaces\tradeshow_in_chicago\index.html
user 46 may be required to e.g., enter a user name and password into login popup menu 208. Within menu 208, user 46 may enter a "username" and "password" that allows them to access online collaborative workspace 200. Once the requisite data in entered into the appropriate data fields within menu 208, user 46 may select "login" button 210 (using onscreen pointer 162).

Upon reviewing email message 150, one or more of the recipients (e.g., "TO" recipients 152, "CC" recipients 154, and "BCC" recipients 156) may wish to generate a response concerning email message 150, which collaboration process 10 may post 118 to online collaborative workspace 200.

Figure 5:
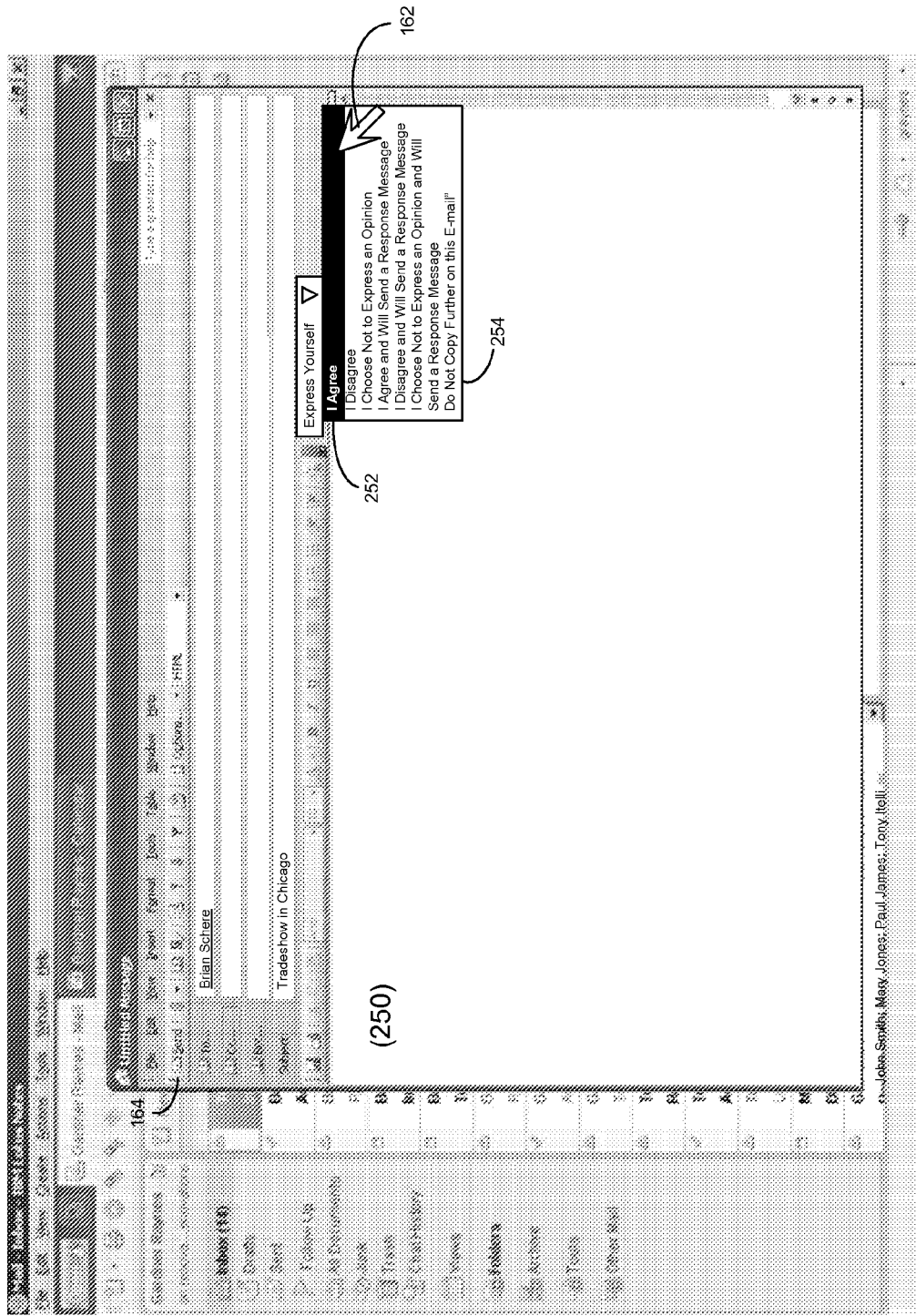
FIG. 5 is a diagrammatic view of a display screen rendered by the collaboration process and/or the email client application of FIG. 1.

Referring also to FIG. 5, collaboration process 10 may allow a first user (e.g., user 48) to generate 120 a first user response message 250 concerning email message 150 received from user 46. First user response message 250 may include at least one predefined comment 252 chosen from a plurality of predefined comments 254.

Examples of the types of predefined comments selectable from plurality of predefined comments 254 may include but are not limited to: "I Agree"; "I Disagree"; "I Choose Not to Express an Opinion"; "I Agree and Will Send a Response Message"; "I Disagree and Will Send a Response Message"; "I Choose Not to Express an Opinion and Will Send a Response Message"; and "Do Not Copy Further on this E-mail".

Accordingly, through the use of predefined comments, a user may quickly and easily respond to an email message. Further, as the recipient selects from a defined number of predefined comments, the response messages generated by the recipients may be tracked and statistically analyzed by collaboration process 10.

Assume for illustrative purposes that user 48 agrees with user 46. Accordingly, when choosing a predefined comment to include within first user response message 250, user 48 may select "I Agree" comment 252 (using onscreen pointer 162) from plurality of predefined comments 254. User 48 may then select "Send" button 164 using onscreen pointer 162, resulting in first user response message 250 being transmitted 122 to user 46. Upon collaboration process 10 receiving 124 notification of user 48 generating 120 and transmitting 122 first user response message 250, collaboration process 10 may post 118 any response messages received (concerning email message 150) to online collaborative workspace 200.

Figure 6:
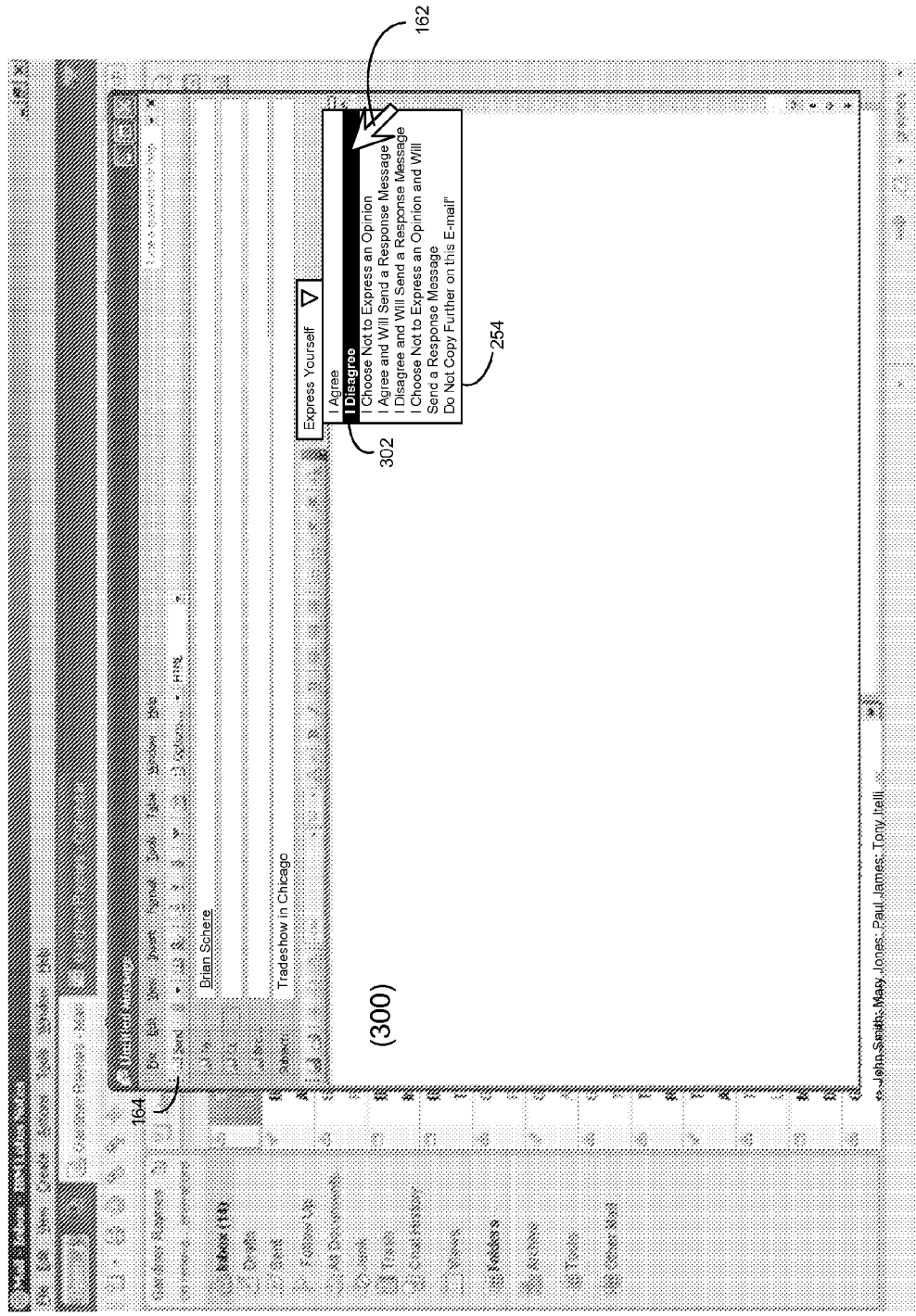
FIG. 6 is a diagrammatic view of a display screen rendered by the collaboration process and/or the email client application of FIG. 1.

The process of generating 120, transmitting 122, and posting 118 user response messages (concerning email message 150) may be repeated for each recipient that generates a response message. For example and referring also to FIG. 6, collaboration process 10 may allow a second user (e.g., user 50) to generate 120 a second user response message 300 concerning email message 150 received from user 46. Like first user response message 250, second user response message 300 may include at least one predefined comment chosen from the plurality of predefined comments 254.

Assume for illustrative purposes that user 50 disagrees with user 46. Accordingly, when choosing a predefined comment to include within second user response message 300, user 50 may select "I Disagree" comment 302 from plurality of predefined comments 254. User 50 may then select "Send" button 164 using onscreen pointer 162, resulting in second user response message 300 being transmitted 122 to user 46. Collaboration process 10 may also post 118 second user response message 300 to online collaborative workspace 200. Upon collaboration process 10 receiving 124 notification of user 50 generating 120 and transmitting 122 second user response message 300, the process of generating 120, transmitting 122, and posting 118 user response messages (concerning email message 150) may be repeated for each recipient that generates a response message.

Collaboration process 100 may provide first and second users (e.g., users 48, 50) with one or more statistics concerning email message 150 and the predefined comments included within the associated user response messages (e.g., first user response message 250 and second user response message 300).

For example, collaboration process 10 may gather and process the user response messages (e.g., first user response message 250 and second user response message 300) and statistics may be provided to users (e.g., users 46, 48, 50, 52) having access to online collaborative workspace 200.

Referring again to FIG. 4, collaboration process 10 may provide 126 one or more statistics concerning email message 150, the predefined comment chosen by first user 48, the predefined comment chosen by second user 50, and/or any other predefined comments chosen by any other users. The above-described statistics may be included within information window 212 that may be rendered by collaboration process 10 and posted 128 to online collaborative workspace 200.

Continuing with the above-stated example in which first user 48 provided first user response message 250 that included predefined comment "I Agree" and second user 50 provided second user response message 300 that included predefined comment "I Disagree", information window 212 may define two categories of predefined comments, namely "I Agree" and I Disagree". While information window 212 is shown to include only two categories, this is for illustrative purposes only and is not intended to be a limitation of this disclosure. For example, information window 212 may be rendered by collaboration process 10 to include each of the eight (8) possible categories of predefined comments, even though no users have selected the predefined comments associated with six (6) of those eight (8) categories.

Providing 126 the users with statistics may include collaboration process 10 providing 130 the users with a numeric count statistic 214 concerning at least one of the plurality of predefined comments and/or providing 132 the users with a percentage statistic 216 concerning at least one of the plurality of predefined comments.

Continuing with the above-stated example, numeric count statistic 214 may be the actual number of user response messages received that contain the specific predefined comment. In this particular example, two user response messages were received, one (i.e., first user response message 250) contained the predefined comment "I Agree" and the other (i.e., second user response message 300) contained the predefined comment "I Disagree". Additionally, percentage statistic 216 may define the percentage of user response messages that contain the specific predefined comment. In this particular example, since two user response messages were received, and one (i.e., first user response message 250) contained the predefined comment "I Agree" and the other (i.e., second user response message 300) contained the predefined comment "I Disagree", 50% of the user messages received contain predefined comment "I Agree" and 50% of the user messages received contain predefined comment "I Disagree".

When posting 108, 118 entries within online collaborative workspace 200, collaboration process 10 may post entries in a chronological fashion. For example, collaboration process 10 may post 118 first user response message 250 (i.e., the response of "Paul James") subsequent to email message 150 (i.e., the original email from user 46). Additionally, collaboration process 10 may post 118 second user response message 300 (i.e., the response of "John Smith") subsequent to first user response message 250 (i.e., the response of "Paul James").

As discussed above, collaboration process 10 may allow user 46 to assign 110 rights based upon recipient type. For example, collaboration process 10 may grant 112 editorial rights, concerning online collaborative workspace 200, to "TO" recipients 152. Additionally, collaboration process 10 may grant 114 read-only rights, concerning online collaborative workspace 200, to "CC" recipients 154. Further, collaboration process 10 may grant 116 read-only rights, concerning online collaborative workspace 200, to "BCC" recipients 156.

In the event that a user's "type" changes, collaboration process 10 may revise 132 the rights of an individual user with respect to online collaborative workspace 200. For example, while "Paul Barclay" is a "CC" recipient with respect to email message 150, assume that upon "Mary Jones" receiving email message 150, "Mary Jones" transmits an email message (not shown) to "Paul Barclay" (i.e., listing "Paul Barclay" as a "TO" recipient. Accordingly, while "Paul Barclay" was initially (i.e., with respect to email message 150) a "CC" recipient, "Paul Barclay" was only granted 114 read-only rights with respect to online collaboration workspace 200. However, as "Paul Barclay" is now a "TO" recipient (i.e., with respect to the email from "Mary Jones"), collaboration process 10 may revise 132 the rights of "Paul Barclay" and grant 112 "Paul Barclay" editorial rights with respect to online collaborative workspace 200.

The manner in which a recipient (e.g., "TO" recipients 152, "CC" recipients 154, and "BCC" recipients 156) may generate responses concerning email message 150 may be based upon one or more rules followed by collaboration process 10. For example, in one implementation of this disclosure, "CC" recipients 154 and "BCC" recipients 156 may be permitted to post a response concerning email message 150 to online collaborative workspace 200. However, "CC" recipients 154 and "BCC" recipients 156 may not be permitted to modify content included within online collaborative workspace 200. In another implementation of this disclosure, "CC" recipients 154 and "BCC" recipients 156 may be permitted to email a response concerning email message 150. However, the response generated by "CC" recipients 154 and "BCC" recipients 156 may not be posted to online collaborative workspace 200. Additionally/alternatively, the manner in which "CC" recipients 154 and "BCC" recipients 156 are permitted to respond concerning email message 150 may be subject to separate sets of rules.

While collaboration process 10 and email server application 20 are shown as being executed on a common computer (i.e., server computer 12), this is for illustrative purposes only and is not intended to be a limitation of this disclosure. Specifically, collaboration process 10 and email server application 20 may each be executed on a separate server computer. Alternatively, either or both of collaboration process 10 and email server application 20 may be executed on a plurality of server computers (not shown).

While collaboration process 10 is described above as providing 126 statistics concerning the predefined comments (e.g., predefined comment 252 and/or predefined comment 302) chosen by the user (e.g., user 46 and/or user 48) from the plurality of predefined comments 254, this is for illustrative purposes only and is not intended to be a limitation of this disclosure. For example, collaboration process 10 may additionally/alternatively provide 126 more rudimentary statistics concerning email message 150. Examples of such rudimentary statistics rendered by collaboration process 10 within information window 212 may include but are not limited to: "email deleted without being opened"; "email deleted after being opened"; "emailed opened"; and "emailed opened and responded to".

A number of implementations have been described. Nevertheless, it will be understood that various modifications may be made. Accordingly, other implementations are within the scope of the following claims.

What is claimed is:

1. A method comprising:
generating, by a collaborative process executing on a computing device, a first email message window including an option to generate an online collaborative workspace, wherein the first email message window is an initial email message in a thread of email messages;
in response to selecting the option from the first email message window, automatically generating, by the collaborative process, an online collaborative workspace associated with the initial email message and the thread of email messages, wherein the collaborative workspace is a separate workspace from the initial email message;
setting, by the collaborative process, a title of the online collaborative workspace to be the same as a subject line of the initial email message;
receiving, by the collaborative process, notification of a first user response message concerning the initial email message, wherein the first user response message includes at least one predefined comment chosen from a plurality of predefined comments;

receiving, by the collaborative process, notification of a second user response message concerning the initial email message, wherein the second user response message includes at least one predefined comment chosen from the plurality of predefined comments;

providing, by the collaborative process, one or more statistics concerning the at least one predefined comment included in the first user response message and the at least one predefined comment included in the second user response message to one or more users having access to the online collaborative workspace;

posting, by the collaborative process, at least a portion of the one or more statistics to the online collaborative workspace;

assigning rights concerning the online collaborative workspace to at least a portion of the one or more recipients, wherein the one or more recipients is chosen from the group consisting of one or more "TO" recipients, one or more "CC" recipients, and one or more "BCC" recipients, and wherein assigning rights concerning the online collaborative workspace includes granting editorial rights for the online collaborative workspace to the "TO" recipients, granting read-only rights for the online collaborative workspace to the "CC" recipients, and granting read-only rights for the online collaborative workspace to the "BCC" recipients; and revising the rights of at least one of the one or more recipients based upon, at least in part, a change in the recipient type of the at least one of the one or more recipients.

2. The method of claim 1 further comprising:
posting at least a portion of the initial email message to the online collaborative workspace.

3. The method of claim 1 wherein the online collaborative workspace is chosen from the group consisting of:
a webpage;
a wiki;
a blog;
a teamspace;
a discussion group; and
an activity group.

4. The method of claim 1 wherein the plurality of predefined comments includes:
"I Agree";
"I Disagree";
"I Choose Not to Express an Opinion";
"I Agree and Will Send a Response Message";
"I Disagree and Will Send a Response Message";
"I Choose Not to Express an Opinion and Will Send a Response Message"; and
"Do Not Copy Further on this E-mail".

5. The method of claim 1 wherein providing the one or more statistics concerning the initial email message includes:
providing a numeric count statistic concerning at least one of the plurality of predefined comments.

6. The method of claim 1 wherein providing the one or more statistics concerning the initial email message includes:
providing a percentage statistic concerning at least one of the plurality of predefined comments.

7. A computer program product residing on a non-transitory computer readable medium having a plurality of instructions stored thereon which, when executed by a processor, cause the processor to perform operations comprising:
generating a first email message window including an option to generate an online collaborative workspace, wherein the first email message window is an initial email message in a thread of email messages;

in response to selecting the option from the first email message window, generating the online collaborative workspace associated with the initial email message and the thread of email messages, wherein the collaborative workspace is a separate workspace from the initial email message;

setting a title of the online collaborative workspace to be the same as a subject line of the initial email message;

receiving notification of a first user response message concerning the initial email message, wherein the first user response message includes at least one predefined comment chosen from a plurality of predefined comments;

receiving notification of a second user response message concerning the initial email message, wherein the second user response message includes at least one predefined comment chosen from the plurality of predefined comments;

providing one or more statistics concerning the at least one predefined comment included in the first user response message and chosen by the first user and the at least one predefined comment included in the second user response message chosen by the second user to one or more users having access to the online collaborative workspace;

posting at least a portion of the one or more statistics to the online collaborative workspace;

assigning rights concerning the online collaborative workspace to at least a portion of the one or more recipients, wherein the one or more recipients is chosen from the group consisting of one or more "TO" recipients, one or more "CC" recipients, and one or more "BCC" recipients, and wherein assigning rights concerning the online collaborative workspace includes granting editorial rights for the online collaborative workspace to the "TO" recipients, granting read-only rights for the online collaborative workspace to the "CC" recipients, and granting read-only rights for the online collaborative workspace to the "BCC" recipients; and revising the rights of at least one of the one or more recipients based upon, at least in part, a change in the recipient type of the at least one of the one or more recipients.

8. The computer program product of claim 7 further comprising instructions for:
posting at least a portion of the initial email message to the online collaborative workspace.

9. The computer program product of claim 7 wherein the online collaborative workspace is chosen from the group consisting of:
a webpage;
a wiki;
a blog;
a teamspace;
a discussion group; and
an activity group.

10. The computer program product of claim 7 wherein the plurality of predefined comments includes:
"I Agree";
"I Disagree";
"I Choose Not to Express an Opinion";
"I Agree and Will Send a Response Message";

"I Disagree and Will Send a Response Message";
"I Choose Not to Express an Opinion and Will Send a Response Message"; and
"Do Not Copy Further on this E-mail".

11. The computer program product of claim 7 wherein the instructions for providing the one or more statistics concerning the initial email message include instructions for:
   providing a numeric count statistic concerning at least one of the plurality of predefined comments.

12. The computer program product of claim 7 wherein the instructions for providing the one or more statistics concerning the initial email message include instructions for:
   providing a percentage statistic concerning at least one of the plurality of predefined comments.

13. The method of claim 1 further comprising:
   providing statistics based upon, at least in part, at least one of: how many times the initial email message was deleted without being opened and how many times the initial email message was deleted after being opened, to the one or more users having access to the online collaborative workspace.

14. The computer program product of claim 7 further comprising instructions for:
   providing statistics based upon, at least in part, at least one of: how many times the initial email message was deleted without being opened and how many times the initial email message was deleted after being opened, to the one or more users having access to the online collaborative workspace.

* * * * *